Sept. 19, 1950  A. E. KENNEDY  2,522,875
MECHANICAL CARDBOARD AND LIKE FIGURE
Filed March 6, 1946  2 Sheets-Sheet 1
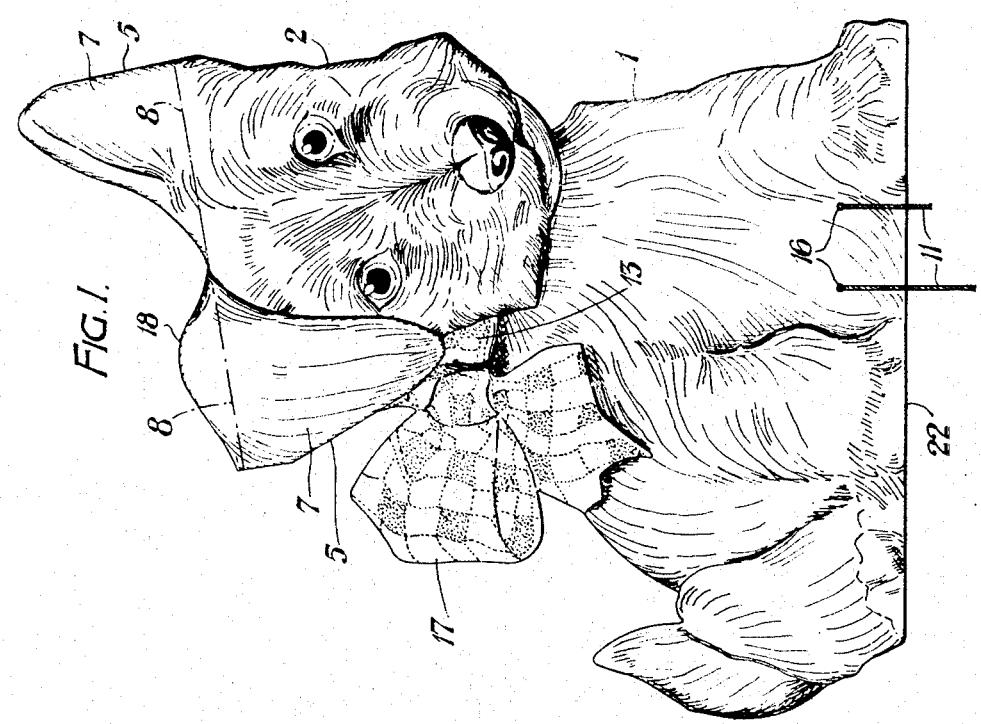
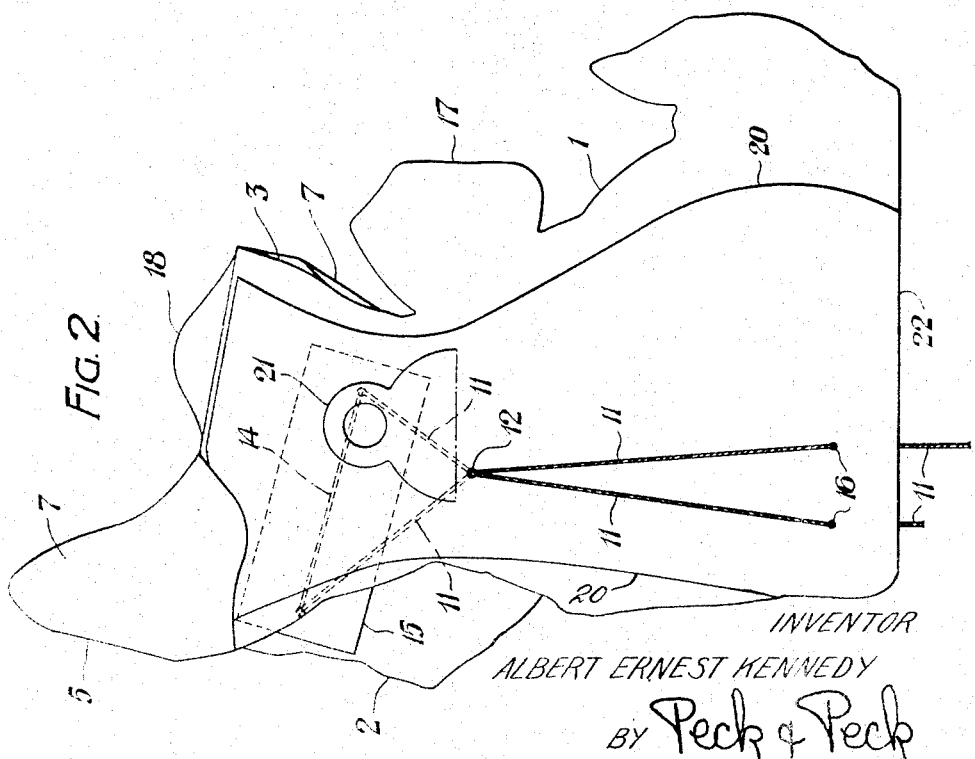
INVENTOR
ALBERT ERNEST KENNEDY
BY Peck & Peck
ATTORNEY Sept. 19, 1950 A. E. KENNEDY 2,522,875
MECHANICAL CARDBOARD AND LIKE FIGURE
Filed March 6, 1946 2 Sheets-Sheet 2

Albert Ernest Kennedy
by Peck & Peck

Patented Sept. 19, 1950

2,522,875

UNITED STATES PATENT OFFICE 2,522,875

MECHANICAL CARDBOARD AND LIKE FIGURE

Albert Ernest Kennedy, London, England

Application March 6, 1946, Serial No. 652,359
In Great Britain March 12, 1945

5 Claims. (Cl. 46—157)

This invention of improvements in and relating to mechanical cardboard and like figures has for one of its objects to provide a device of novelty character which is capable of application for pleasingly portraying animals in different poses.

According to this invention, a mechanical cardboard or like figure depicting an animal, for instance a dog, cat, rabbit or donkey, is constructed so that the head of the animal is movable from side to side and so that when the head moves in either direction one ear folds in one direction while the other unfolds in the opposite direction.

Figure 3:
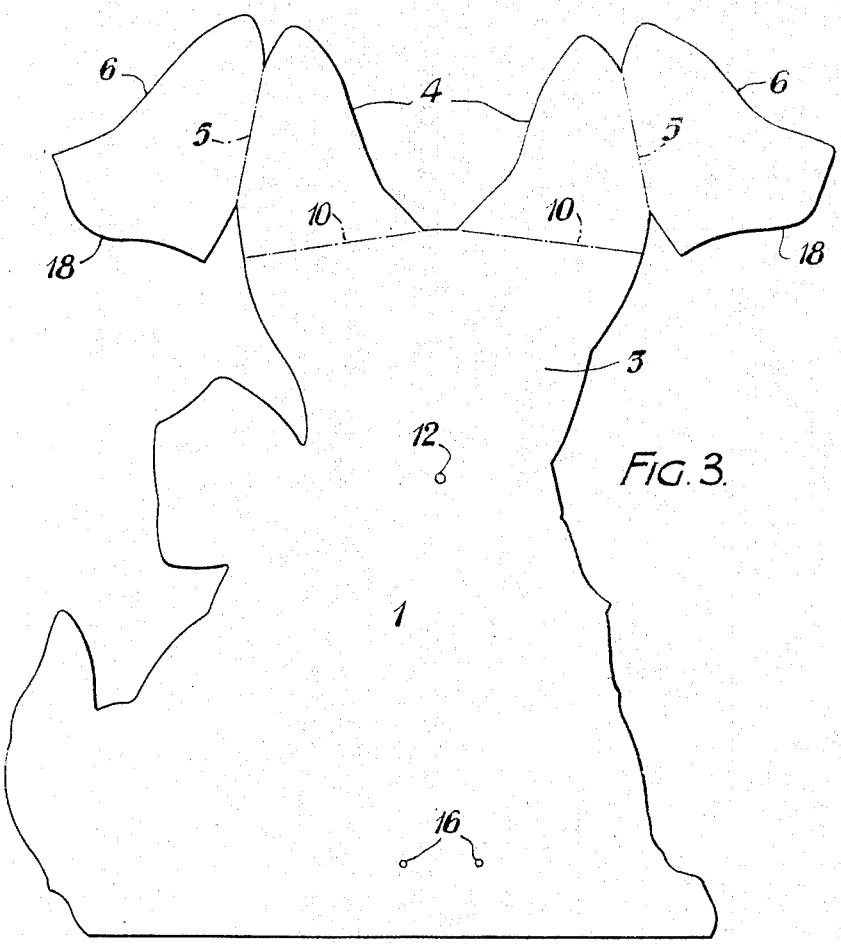
Figure 4:
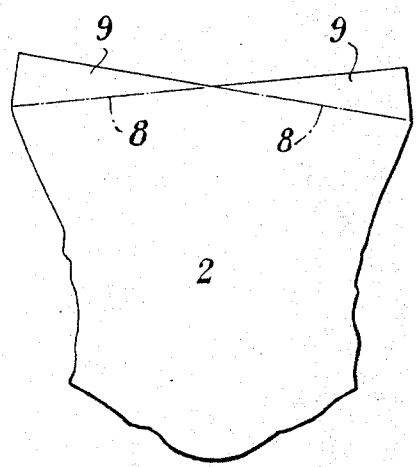

In order to enable the invention to be readily understood reference is directed to the accompanying drawings, wherein:

Figure 1 is a front elevation of one practical example of mechanical cardboard or like figure in accordance with the present improvements, Figure 2 is a rear elevation of the figure, Figures 3 and 4 are views of two shaped pieces of cardboard or the like used in constructing the figure.

The mechanical cardboard or like figure shown in Figure 1 represents a dog in a sitting position. The device is formed from two shaped pieces 1, 2 of cardboard or the like respectively shown separately in Figures 3 and 4. One of these pieces, marked 1, is printed with the body of the dog and the other one, marked 2, is printed with the head as shown in Figure 1. The designs for these pieces are printed flat on a sheet of cardboard or the like and cut out in the ordinary way with a cutter preliminary to making up. The same cutter can be used for cutting out both pieces. The body piece 1, though not printed with the head, has a portion 3, Figure 3, at the top which is somewhat or partly of head shape and may be left blank or unprinted because it lies under the head piece 2 in the completed figure. This portion 3 terminates at the top in portions 4, sticking up, which are shaped like the ears and printed to represent the front of the ears. To these ear portions 4 are hingedly connected down the outer side edge at 5 two other portions 6 of ear shape which are printed on the front to represent the back view of the ears. The cardboard or the like is scored, creased or folded to form the hinges 5 as shown by the dot-and-dash lines in Figure 3 and other hinged connections hereinafter mentioned can be similarly formed and are similarly represented. The other or head piece 2 of the figure is printed with that much of the head as about reaches to the bottom or root of the ears which are marked 7 in Figures 1 and 2. At the top this piece 2, as shown in Figure 4, has an edge of shallow V shape, and scorings, creases or folds 8 can be continued from each leg of the V across the material so that legs and scores or the like cross in X fashion. The narrow triangular parts 9 between the top edge and the scores or the like 8 are used for anchoring this head piece by adhesive lugs or wire or cotton stitching to the first or body piece 1. For this purpose the head piece, after applying, say, an adhesive to the said triangular parts and lugs on their fronts, which need not be printed on, is placed upside down and face backwards at the roots of the ear extension portions 4 on the top of the blank head-shaped portion 3 of the body 1, the lugs (if used) inserted and the whole pressed firmly to secure the head to the body at the triangular parts. The head part 2 is then hinged down (for example as indicated in Figure 1), about one or the other of the hinge lines 8 and the collinear one of the pair of hinge lines 10 at the root of the ear parts 4 at the top of the body piece, Figure 3, the latter hinge lines coinciding with the edges of the aforesaid V, so that the hinges 8 and 10 have a crosswise disposition as will be clear from Figures 3 and 4. When the head is mounted the other ear portions 6 on the body are folded on their hinges 5 and fastened or stuck down on the parts 4 to complete the ears 7.

On reference to Figure 2, it will be seen that two strings 11 are led from the back of the head piece on opposite sides and brought down to be passed through a hole formed at 12 in the body piece 1 at, say, the level of the dog's collar 13. As shown, the strings may be provided from a length of string of the like secured to the head piece 2 by pasting the central part 14 of the same under a strip 15 of card or paper pasted onto the back of the head piece. The strings 11 may be led down the back of the body piece and their ends passed through to the front through two perforations disposed, say, at 16 between the legs of the dog near the paws. One string 11 will always appear to be shorter than the other according to the position of the dog's head and as will be clear from the drawings, but in front elevation the strings substantially do not obscure the artistic features of the dog because they only appear at the bottom of the figure.

It will be understood that owing to the particular cross wise hinging of the head 2 and ears 7 to the body piece at 8 and 10, the head will always lie to one side or other at a slight inclination with the ear at that side extended upwardly and the ear at the other side folded down, as indicated in Figure 1. If the now shorter of the two strings 11 be pulled, the head will swing over about the other pair of collinear hinge lines 8, 10 to a position on the other side and the ears change position. The words "Pull short string" may be printed on the body piece above or below or alongside the aforesaid two perforations, if desired, by way of directions for obtaining the designed effects.

A figure of this nature may be made up in colours, say as a cairn terrier or Scotty, with a decorative collar 13 flanked on the left of the body by a decorative bow 17. A cairn terrier or Scotty has a very appealing expression about the face and by working the strings 11 as stated, natural movements of the dog's head may be very delightfully simulated with the added attraction of the ear hinging movements which can be made to be quite pretty. The parts 6 forming the backs of the ears 7 would suitably be shaped at the bottom 18 to extend below the ear hinges 8 so when folded down a small part 18 projects up sufficiently to show the correct shape of the top of the head at the root of the ears as seen at the left-hand side of Figure 1.

If desired, and for strength, the back of the body piece may be reinforced by a back piece 20, Figure 2, of suitable shape firmly secured by adhesive or otherwise and particularly covering the portions of the body piece at the perforations where the strings pass through at 12 and 16, and reinforcing the neck and blank head portion 3. This back piece would also be perforated at 12 and 16 for passage of the strings 11. Moreover, a part of such back piece may be cut or shaped to form an eyelet hanger, such as 21, for mounting the figure on a wall or other surface.

The figure would suitably be cut off level at the bottom as at 22. When it is to be combined with a printed or artistic production suspended below it, the back piece 20 may be extended at the bottom to provide for the suspension.

The features of construction which have been described as being capable of making the mechanical figure provide such an appeal to the senses as discussed in connection with a dog, can be embodied in other animals to provide equally appropriate effects in those animals. It will be readily understood, for example, what pleasing or humorous effects could be obtained with the figures of a cat, rabbit or donkey, and so on.

What I claim is:

1. A mechanical figure comprising a first part of stiff sheet material, a second part of stiff sheet material disposed in overlapping relation to the first part, and an intermediate part composed of two sections, one of said sections hingedly connected to the first part along a portion of a first rectilinear line and to the second part along a portion of a second rectilinear line which intersects the first said line intermediate the ends of the lines to divide said intermediate part into the two sections, and the other of said sections hingedly connected to the first part along the remaining portion of said second rectilinear line and to the second part along the remaining portion of said first rectilinear line, the second part being movable between two end positions in the same plane about the point of intersection of the said rectilinear lines to cause one section of the intermediate part to turn substantially through 180° about the associated portion of said first line from a position in which it overlies the first part to a position in which it forms a substantially co-planar extension thereof as the second part is moved from its one end position to the other end position while the other section of the intermediate part is turned bodily in the opposite sense about the associated portion of the second rectilinear line.

2. A mechanical figure comprising a first part of stiff sheet material, a second part of stiff sheet material disposed in overlapping relation to the first part, and an intermediate part composed of two sections, one of said sections hingedly connected to the first part along a portion of a first rectilinear line and to the second part along a portion of a second rectilinear line which intersects the first said line intermediate the ends of the lines to divide said intermediate part into the two sections, and the other of said sections hingedly connected to the first part along the remaining portion of said second rectilinear line and to the second part along the remaining portion of said first rectilinear line, the second part being movable between two end positions in the same plane about the point of intersection of the said rectilinear lines to cause one section of the intermediate part to turn substantially through 180° about the associated portion of said first line from a position in which it overlies the first part to a position in which it forms a substantially co-planar extension thereof as the second part is moved from its one end position to the other end position while the other section of the intermediate part is turned bodily in the opposite sense about the associated portion of the second rectilinear line, and a third part of stiff sheet material extending from the first part of stiff sheet material beyond the rectilinear lines defining a section of the intermediate part, said third part being connected to one of the sections of the intermediate part and movable bodily therewith substantially through 180° when the second part is moved between two end positions so as to appear as a substantially co-planar extension of the second part in one of its end positions of movement.

3. A mechanical figure in accordance with claim 2 having duplicate third parts, one for each section of the intermediate part, and arranged so that the said duplicate parts appear alternately as substantially co-planar extensions of the second part as the latter occupies one or the other of its end positions of movement.

4. A mechanical figure in accordance with claim 3 and means for moving the second part between its end positions.

5. A mechanical figure representing an animal, comprising a body part of stiff sheet material, a head part of stiff sheet material disposed in overlapping relation to the body part, duplicate ear parts formed as substantially co-planar extensions of the body part and hingedly connected thereto along rectilinear lines which intersect at a point between the ears, an extension at the top edge of the head part having two sections hingedly connected thereto along rectilinear lines which intersect at substantially a midpoint transversely of the head, the two sections of the extension attached to the ears adjacent the lines of connection between the ears and the body, and strings attached to the rearward surface of the head part at laterally spaced points to effect a side-to-side swinging motion of the head part with alternate erecting and downturning motions of the ear parts.

ALBERT ERNEST KENNEDY.

REFERENCES CITED

The following references are of record in the file of this patent:

UNITED STATES PATENTS

| Number | Name | Date |
| --- | --- | --- |
| 1,182,077 | Colucci | May 9, 1916 |